UNITED STATES PATENT OFFICE.

JAMES BURNS, OF VERONA, PENNSYLVANIA.

PROCESS OR METHOD OF WELDING COPPER UPON STEEL OR WELDING COPPER UPON IRON.

SPECIFICATION forming part of Letters Patent No. 577,817, dated February 23, 1897.

Application filed May 9, 1896. Serial No. 590,929. (No specimens.)

*To all whom it may concern:*

Be it known that I, JAMES BURNS, a citizen of the United States, residing at Verona, in the county of Allegheny, State of Pennsylvania, have invented certain new and useful Improvements in Processes or Methods of Welding Copper Upon Steel or Welding Copper Upon Iron; and I do declare the following to be a full, clear, and exact description of the invention, such as will enable others skilled in the art to which it appertains to make and use the same.

My invention relates to the process or method of welding copper upon iron and welding copper upon steel.

In the application of my invention for welding copper upon iron or steel I preferably use an iron or steel ingot having an indentation or depression therein having raised sides, the depth of said indentation being about equal to the thickness of the copper sheet or plate to be welded upon said ingot. I then sprinkle or dust upon the surface of the copper sheet or plate in contact with the surface of the iron or steel a compound consisting of lye or other caustic alkali and copper ore prepared as follows, viz: I evaporate the lye by placing the same in an open crucible and then mix the same with crushed or finely-comminuted Lake Superior or other ordinary copper ore, oxid of copper, or copper scales. Said ore is prepared as hereinafter stated and combined with lye or other caustic soda in about the proportions of two (2) to one (1). When oxid of copper or scales of copper are used instead of ore, the same proportions are maintained. Said ore, oxid of copper, or scales of copper are treated as follows: First, crushed and then placed in an oven or annealing-box and brought to a red heat. Then, if necessary, further crushed and mixed, as above stated, with powdered lye or other caustic soda in the proportions above stated, and, as heretofore stated, sprinkled or dusted upon the surface of the copper to be welded upon iron or steel. Then by applying pressure by placing said ingot under a hammer or passing through rolls the same is welded. If when said mixture is applied to the surface of the copper a spluttering or bubbling is produced, I wait until the same subsides before applying the pressure. This occurs when there is a marked difference in the temperatures of the copper and iron or steel.

The sides of the depression in the face of the steel or iron ingot prevents the copper being drawn out of proportion with the iron.

Having described my invention, what I claim, and desire to secure by Letters Patent, is—

The herein-described process of welding together copper and iron or steel, consisting in applying a mixture of oxid of copper and powdered alkali between the contact-surfaces of the plates or masses of the said metals and compressing them with the said mixture between them under the influence of heat, substantially as and for the purpose set forth.

In testimony whereof I affix my signature in the presence of two witnesses.

JAMES BURNS.

In presence of—
JAS. J. MCAFEE,
JOHN H. RONEY.